United States Patent
Motchelaho et al.

(10) Patent No.: US 11,518,717 B2
(45) Date of Patent: Dec. 6, 2022

(54) SINTERED POLYCRYSTALLINE CUBIC BORON NITRIDE MATERIAL

(71) Applicant: Element Six (UK) Limited, Didcot (GB)

(72) Inventors: Anne Myriam Megne Motchelaho, Didcot (GB); Santonu Ghosh, Didcot (GB); Antionette Can, Didcot (GB)

(73) Assignee: Element Six (UK) Limited, Didcot (GB)

( * ) Notice: Subject to any disclaimer, the term of this patent is extended or adjusted under 35 U.S.C. 154(b) by 128 days.

(21) Appl. No.: 16/093,450

(22) PCT Filed: May 31, 2017

(86) PCT No.: PCT/EP2017/063104
§ 371 (c)(1),
(2) Date: Oct. 12, 2018

(87) PCT Pub. No.: WO2017/207601
PCT Pub. Date: Dec. 7, 2017

(65) Prior Publication Data
US 2019/0119167 A1     Apr. 25, 2019

(30) Foreign Application Priority Data

Jun. 2, 2016 (GB) ..................................... 1609672

(51) Int. Cl.
*C04B 35/5831* (2006.01)
*C04B 35/626* (2006.01)
(Continued)

(52) U.S. Cl.
CPC .......... *C04B 35/5831* (2013.01); *B22F 1/107* (2022.01); *B22F 9/04* (2013.01);
(Continued)

(58) Field of Classification Search
CPC ............ C04B 35/5831; C04B 35/6261; C04B 35/645; C04B 2235/3217;
(Continued)

(56) References Cited

U.S. PATENT DOCUMENTS 4,334,928 A     6/1982   Hara et al.
5,271,749 A *  12/1993  Rai .......................... B24D 3/06
                                                            501/87
(Continued)

FOREIGN PATENT DOCUMENTS

EP     0715930 A1    6/1996
EP     0974566 A1    1/2000
(Continued)

OTHER PUBLICATIONS

International Patent Application No. PCT/EP2017/063104, International Search Report and Written Opinion dated Aug. 29, 2017, 13 pages.

*Primary Examiner* — Bryan D. Ripa
*Assistant Examiner* — Ross J Christie
(74) *Attorney, Agent, or Firm* — Kilpatrick Townsend & Stockton LLP

(57) ABSTRACT

Polycrystalline cubic boron nitride, PCBN, material and methods of making PCBN. A method includes providing a matrix precursor powder comprising particles having an average particle size no greater than 250 nm, providing a cubic boron nitride, cBN, powder comprising particles of cBN having an average particle size of at least 0.2 intimately mixing the matrix precursor powder and the cBN powder, and sintering the intimately mixed powders at a temperature of at least 1100° C. and a pressure of at least 3.5 GPa to form the PCBN material comprising particles of cubic boron nitride, cBN dispersed in a matrix material.

9 Claims, 8 Drawing Sheets

(51) Int. Cl.
    *C04B 35/645*     (2006.01)
    *C22C 26/00*     (2006.01)
    *B22F 1/107*     (2022.01)
    *B22F 9/04*     (2006.01)

(52) U.S. Cl.
    CPC ........ *C04B 35/6261* (2013.01); *C04B 35/645* (2013.01); *C22C 26/00* (2013.01); *B22F 2202/01* (2013.01); *B22F 2998/10* (2013.01); *B22F 2999/00* (2013.01); *C04B 2235/3217* (2013.01); *C04B 2235/386* (2013.01); *C04B 2235/3813* (2013.01); *C04B 2235/3843* (2013.01); *C04B 2235/3856* (2013.01); *C04B 2235/3865* (2013.01); *C04B 2235/3886* (2013.01); *C04B 2235/5436* (2013.01); *C04B 2235/5445* (2013.01); *C04B 2235/5454* (2013.01); *C04B 2235/72* (2013.01); *C04B 2235/783* (2013.01); *C04B 2235/784* (2013.01); *C22C 2026/003* (2013.01)

(58) Field of Classification Search
    CPC .... C04B 2235/3813; C04B 2235/3843; C04B 2235/3856; C04B 2235/386; C04B 2235/3865; C04B 2235/3886; C04B 2235/5436; C04B 2235/5445; C04B 2235/5454; C04B 2235/72; C04B 2235/783; C04B 2235/784; B22F 1/107; B22F 9/04; B22F 2201/01; B22F 2998/10; B22F 2999/00; C22C 26/00; C22C 26/003
See application file for complete search history.

(56) References Cited

U.S. PATENT DOCUMENTS

| | | | |
|---|---|---|---|
| 6,287,489 B1 * | 9/2001 | Rolander | C04B 35/52 264/642 |
| 7,867,438 B2 * | 1/2011 | Can | C04B 35/5831 419/10 |
| 8,124,553 B2 * | 2/2012 | Okamura | C04B 35/6261 501/96.4 |
| 2004/0002418 A1 * | 1/2004 | Scurlock | C04B 35/6261 501/96.4 |
| 2008/0209818 A1 * | 9/2008 | Belnap | C22C 26/00 51/307 |
| 2009/0003123 A1 * | 1/2009 | Morrison, Jr. | B01F 5/0682 366/76.1 |
| 2012/0302425 A1 | 11/2012 | Okamura et al. | |
| 2015/0290135 A1 * | 10/2015 | Chamarthy | A61K 9/16 514/172 |
| 2017/0101346 A1 * | 4/2017 | Yumoto | C04B 41/52 |

FOREIGN PATENT DOCUMENTS

| | | |
|---|---|---|
| EP | 2108632 A1 | 10/2009 |
| EP | 2420483 A1 | 2/2012 |
| EP | 2591869 A1 | 5/2013 |
| EP | 2612719 A1 | 7/2013 |
| JP | 2008208028 A1 | 9/2008 |
| RU | 2576745 C1 | 3/2016 |
| WO | 2006032984 A2 | 3/2006 |
| WO | 2010073198 A2 | 7/2010 |
| WO | 2011098556 A1 | 8/2011 |
| WO | 2015147249 A1 | 10/2015 |
| WO | 2016005342 A1 | 1/2016 |

* cited by examiner

SINTERED POLYCRYSTALLINE CUBIC BORON NITRIDE MATERIAL

FIELD

The invention relates to the field of sintered polycrystalline cubic boron nitride materials, and to methods of making such materials.

BACKGROUND

Polycrystalline super hard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials.

Abrasive compacts are used extensively in cutting, milling, grinding, drilling and other abrasive operations. They generally contain ultrahard abrasive particles dispersed in a second phase matrix. The matrix may be metallic or ceramic or a cermet. The ultrahard abrasive particles may be diamond, cubic boron nitride (cBN), silicon carbide or silicon nitride and the like. These particles may be bonded to each other during the high pressure and high temperature compact manufacturing process generally used, forming a polycrystalline mass, or may be bonded via the matrix of second phase material(s) to form a sintered polycrystalline body. Such bodies are generally known as polycrystalline diamond or polycrystalline cubic boron nitride, where they contain diamond or cBN as the ultra-hard abrasive, respectively.

U.S. Pat. No. 4,334,928 teaches a sintered compact for use in a tool consisting essentially of 20 to 80 volume % of cubic boron nitride; and the balance being a matrix of at least one matrix compound material selected from the group consisting of a carbide, a nitride, a carbonitride, a boride and a silicide of a IVa or a Va transition metal of the periodic table, mixtures thereof and their solid solution compounds. The matrix forms a continuous bonding structure in a sintered body with the high pressure boron nitride interspersed within a continuous matrix. The methods outlined in this patent all involve combining the desired materials using mechanical milling/mixing techniques such as ball milling, mortars and the like.

Sintered polycrystalline bodies may be 'backed' by forming them on a substrate. Cemented tungsten carbide, which may be used to form a suitable substrate, is formed from carbide particles dispersed, for example, in a cobalt matrix by mixing tungsten carbide particles/grains and cobalt together then heating to solidify. To form the cutting element with an ultra-hard material layer such as PCD or PCBN, diamond particles or grains or CBN grains are placed adjacent the cemented tungsten carbide body in a refractory metal enclosure such as a niobium enclosure and are subjected to high pressure and high temperature so that intergrain bonding between the diamond grains or CBN grains occurs, forming a polycrystalline super hard diamond or polycrystalline CBN layer.

In some instances, the substrate may be fully cured prior to attachment to the ultra-hard material layer whereas in other cases, the substrate may be green (not fully cured). In the latter case, the substrate may fully cure during the HTHP sintering process. The substrate may be in powder form and may solidify during the sintering process used to sinter the ultra-hard material layer.

FIG. 1 shows an exemplary method for producing a sintered PCBN material. The following numbering corresponds to that of FIG. 1:

S1. Matrix precursor powders are pre-mixed. Examples of matrix precursor powders include carbides and/or nitrides of titanium and aluminium. Typical average particle sizes for the matrix precursor powders are 1 to 10 μm.

S2. The matrix precursor powders are heat treated at over 1000° C. for at least an hour to initiate a pre-reaction between the matrix precursor particles and to form a "cake".

S3. The cake is crushed and sieved to obtain the desired size fraction of particles.

S4. Cubic boron nitride (cBN) particles with an average particle size of 0.5 to 15 μm are added to the sieved matrix precursor powders.

S5. The resultant mixed powders are attrition milled to break down the matrix precursor powders to a desired size (typically 50 to 700 nm) and to intimately mix the matrix precursor powders with the cBN particles. This process may take many hours, and involves using milling media such as tungsten carbide balls.

S6. The resultant milled powder is dried under vacuum or low pressure at above 60° C. to remove solvent, and subsequently conditioned by slowly allowing oxygen into the system to passivate metallic surfaces such as aluminium.

S7. The dried powder is sieved and a pre-composite assembly is prepared.

S8. The pre-composite assembly is heat treated at above 700° C. to remove any adsorbed water or gases.

S9. The outgassed pre-composite assembly is assembled into a capsule suitable for sintering.

S10. The capsule is sintered in a high pressure high temperature (HPHT) process of at least 1250° C. and at least 4 GPa to form a sintered PCBN material.

The entire process is very time consuming and on a commercial scale can take up to five days.

During the attrition milling process, the powders can pick up impurities from the milling media. FIG. 2 is a micrograph of a sintered PCBN material in which the attrition milling was performed with tungsten carbide balls. The white particles (examples of which are highlighted in black circles) are particles of tungsten carbide. A sintered PCBN material can contain up to 8 weight % tungsten carbide. These particles are known to have a detrimental effect on the properties of the PCBN material, particularly in applications such as hard part turning. Furthermore, the tungsten carbide pickup during attrition milling is not controlled, so different batches may contain different amounts of tungsten carbide with different size distributions, leading to unpredictable performance of the sintered PCBN material when used in a tool application.

SUMMARY

It is an object to provide a sintered PCBN material with a greatly reduced tungsten carbide content.

According to a first aspect, there is provided a method of making a PCBN material. A matrix precursor powder comprising particles having an average particle size no greater than 250 nm is provided. A cBN powder comprising particles of cBN having an average particle size of at least 0.2 μm is also provided. The matrix precursor powder and the cBN powder are intimately mixed. The intimately mixed powders are sintered at a temperature of at least 1100° C. and a pressure of at least 3.5 GPa to form the PCBN material comprising particles of cubic boron nitride, cBN dispersed in a matrix material. An advantage of this method is that milling media are not used so the resultant PCBN contains no impurities from milling media, such as tungsten carbide. A further advantage is that no attrition milling step is necessary, and so the overall time to prepare the PCBN is reduced. A further advantage is that the small size of the matrix precursor particles makes them more reactive during the sintering step.

As an option, the method comprising providing a matrix precursor powder comprising particles having an average particle size no greater than 100 nm.

The step of intimately mixing the matrix powder and the cBN powder optionally comprises dispersing the matrix precursor powder and the cBN powder in a solvent, mixing the solvent, matrix precursor powder and cBN powder using an ultrasonic mixer, and removing the solvent to leave an intimately mixed powder of matrix precursor particles and cBN particles.

As an alternative option, the step of intimately mixing the matrix powder and the cBN powder comprises dry acoustic mixing.

As an option, the method comprises providing cBN powder particles with an average size between 0.2 and 15 μm. The cBN particles optionally have an average size greater than 1 μm. As a further option, the cBN particles have an average size in a range of 5 μm to 10 μm.

The cBN particles optionally have a multi-modal average size distribution.

The resultant PCBN material optionally comprises less than 80 volume percent of the cBN particles.

As an option, the matrix material comprises materials selected from compounds of any of titanium and aluminium. Exemplary matrix materials include any of titanium carbonitride, titanium carbide, titanium nitride, titanium diboride, aluminium nitride and aluminium oxide.

According to a second aspect, there is provided a method of making a PCBN material. The method comprises providing a matrix precursor powder comprising particles. The matrix precursor powder is attrition milled using milling media to achieve an average particle size no greater than 1 μm. The milled matrix precursor powder is intimately mixed with a cBN powder comprising particles having an average particle size of at least 0.2 μm. The intimately mixed powders are sintered at a temperature of at least 1100° C. and a pressure of at least 3.5 GPa to form the PCBN material comprising particles of cubic boron nitride, cBN dispersed in a matrix material. An advantage of this method is that the resultant PCBN material has a very low content of impurities from milling media of less than 0.5 weight percent because attrition milling is not performed after the cBN has been added.

As an option, the step of intimately mixing the matrix powder and the cBN powder comprises dispersing the milled matrix precursor powder and cBN powder in a solvent, mixing the solvent, matrix precursor powder and cBN powder using an ultrasonic mixer, and removing the solvent to leave an intimately mixed powder of matrix precursor particles and cBN particles. As a further option, a surfactant is added to the solvent.

As an alternative option, the step of intimately mixing the matrix powder and the cBN powder comprises dry acoustic mixing.

As an option, the milled matrix precursor powder comprises particles having an average particle size no greater than 200 nm.

The cBN particles optionally have an average size between 0.2 and 15 μm, or greater than 1 μm. The cBN particles optionally have a multi-modal average size distribution.

The resultant PCBN material optionally comprises less than 80 volume percent of the cBN particles.

As an option, the matrix material comprises materials selected from compounds of any of titanium and aluminium. Exemplary materials include any of titanium carbonitride, titanium carbide, titanium nitride, titanium diboride, aluminium nitride and aluminium oxide.

As an option, the matrix precursor powder is attrition milled to achieve an average particle size no greater than 700 nm. As a further option, the matrix precursor powder is attrition milled to achieve an average particle size no greater than 500 nm.

According to a third aspect, there is provided a polycrystalline cubic boron nitride (PCBN) material. The PCBN material comprises particles of cubic boron nitride (cBN) dispersed in a matrix material comprising at least one titanium-containing compound. The PCBN material comprises no greater than 0.5 weight percent of impurities from milling media.

As an option, the PCBN material comprises no milling media impurities.

The milling media impurities optionally comprise a material selected from any of tungsten carbide, silicon carbide, aluminium oxide, zirconium oxide, titanium carbide and boron carbide, as these are commonly used as milling media for attrition milling.

The cBN particles optionally have an average size between 0.2 and 15 μm. As a further option, the cBN particles have an average size greater than 1 μm.

As an option, the cBN particles have a multi-modal average size distribution.

The PCBN material optionally comprises less than 80 volume percent of the cBN particles.

The matrix material optionally comprises materials selected from compounds of any of titanium and aluminium. As a further option, the matrix material comprises any of titanium carbonitride, titanium carbide, titanium nitride, titanium diboride, aluminium nitride and aluminium oxide.

According to a fourth aspect, there is provided a tool comprising a sintered polycrystalline material as described in the third aspect, the tool being for any of cutting, milling, grinding, drilling, or other abrasive applications.

BRIEF DESCRIPTION OF DRAWINGS

Non-limiting embodiments will now be described by way of example and with reference to the accompanying drawings in which.

DETAILED DESCRIPTION

The inventors have realised that the presence of impurities from milling media during the attrition milling step can be eliminated by eliminating the attrition milling step. Attrition milling is used not only to break down the matrix precursor particles to a desired size, but also to intimately mix and disperse the matrix precursor particles and the cBN particles. In a first embodiment, it has been found that using matrix precursor powders that are already of the appropriate desired size, and using techniques other than attrition milling to intimately mix the matrix precursor particles and the cBN particles can lead to a sintered PCBN material that is free of milling media impurities.

Figure 3:
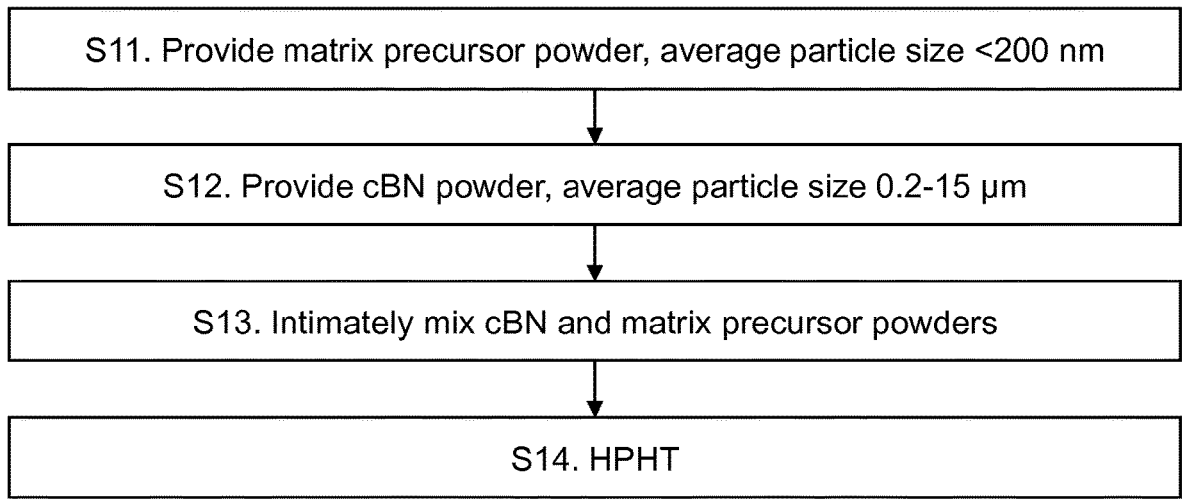
FIG. 3 is a flow diagram showing exemplary steps of a method of making a sintered PCBN material with substantially no tungsten carbide content.

Turning to FIG. 3, there is shown a flow diagram that illustrates exemplary steps according to the first embodiment. The following numbering corresponds to that of FIG. 3:

S11. Nano-particles of matrix precursor powders are provided, the particles having an average particle size of no greater than 200 nm.

S12. A cBN powder is also provided. The average size of the cBN particles in the cBN powder is at least 0.2 μm. The size distribution of the cBN may be mono-modal or multi-modal (including bi-modal).

S13. The cBN powder and the matrix precursor powders are intimately mixed using a technique that does not require milling media, for example by ultrasonic mixing in a solvent or by dry acoustic mixing.

S14. The mixed powders are sintered in a high pressure high temperature (HPHT) press at a temperature of at least 1100° C. and a pressure of at least 3.5 GPa to form a PCBN material comprising cBN particles in a matrix containing at least one titanium compound. Exemplary matrix materials are titanium carbonitride, titanium carbide, titanium nitride, titanium diboride, aluminium nitride and aluminium oxide. Other materials, such as compounds based on hafnium, may also be present.

The resultant sintered PCBN material contains no tungsten carbide at all, or other impurities that would normally arise from milling media, as there was no attrition milling step using tungsten carbide. In addition to preparing a PCBN that is free of tungsten carbide or other milling media impurities, the lack of attrition milling and pre-reaction steps means that the time to prepare sintered PCBN materials is greatly reduced. An advantage of using nano-particles for the precursor matrix powders is that they have a high surface area and are therefore very reactive during sintering.

While the use of nano-powders for the matrix precursor powders has many advantages, it may not always be appropriate to use non-sized matrix precursor powders. Nano-powders comprising small particles can lead to powder handling problems such as agglomeration and dealing with enhanced reactivity of the nano-powders. The inventors have realised that most pickup from the milling media during attrition milling is caused by the presence of cBN. Milling media such as tungsten carbide balls are harder than the matrix precursor powders, so the matrix precursor powders are unlikely to degrade the tungsten carbide balls. However, cBN is harder than the tungsten carbide balls and so will degrade the tungsten carbide balls leading to tungsten carbide pickup.

In a second specific embodiment, the matrix precursor powders are attrition milled without the presence of cBN to reduce the matrix precursor powder particle size. cBN particles are subsequently added to the matrix precursor powders and intimately mixed before pressing and sintering to form a sintered PCBN material. It has been found that this technique can lead to a sintered PCBN material that has less than 0.5% weight percent tungsten carbide.

Figure 4:
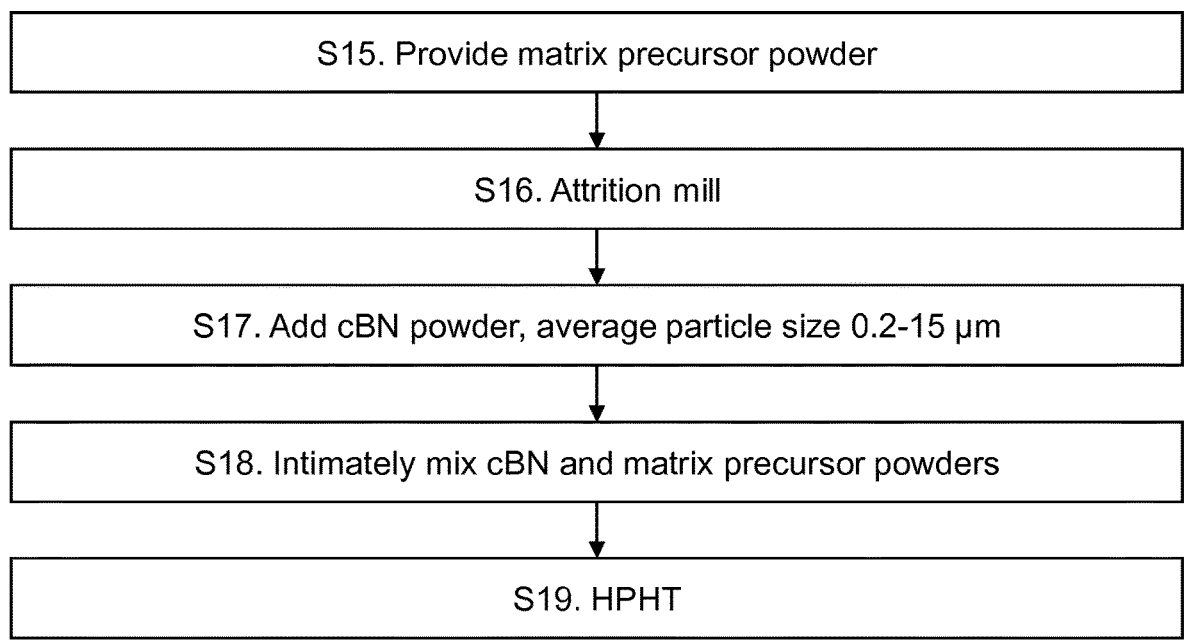
FIG. 4 is a flow diagram showing exemplary steps of a method of making a sintered PCBN material with a greatly reduced tungsten carbide content.

Turning to FIG. 4, is a flow diagram that illustrates exemplary steps according to the second embodiment. The following number corresponds to that of FIG. 4:

S15. A matrix precursor powder is provided.

S16. The matrix precursor powder is attrition milled using milling media such as tungsten carbide balls to reduce the particle size and intimately mix the matrix precursors powders. The average particle size is reduced to up to 700 nm. Typically this may be around 200 to 250 nm S17. After attrition milling, the milling media is removed and cBN particles are added to the milled matrix precursor powders in the desired quantity.

S18. The mixed matrix precursor powders and cBN particles are intimately mixed using a technique that does not require milling media, for example by ultrasonic mixing in a solvent or by dry acoustic mixing.

S19. The mixed powders are sintered in a high pressure high temperature (HPHT) press at a temperature of at least 1100° C. and a pressure of at least 3.5 GPa to form a PCBN material comprising cBN particles in a matrix containing at least one titanium compound. Exemplary matrix materials are titanium carbonitride, titanium carbide, titanium nitride, titanium diboride, aluminium nitride and aluminium oxide. Other materials, such as compounds based on hafnium, may also be present.

The technique described in the FIG. 4 overcomes some of the problems of powder handling that the use on nano-powders in the first specific embodiment encounters. There is a small amount of tungsten carbide pickup during the attrition milling of the matrix precursor powders, but this is negligible compared to the amount of tungsten carbide pickup observed when the cBN particles are attrition milled. The sintered PCBN material has a tungsten carbide content of less than 0.5 weight percent.

For both the first and second embodiments described above, there is a step of intimately mixing the matrix precursor powders with cBN particles. As described, this may be done by ultrasonic mixing. This may be in a solvent, in which case the powders are dispersed in a solvent, ultrasonically mixed, and the solvent then removed. A surfactant may be added to stabilize the powders in the solvent. Exemplary solvents include hexane, ethanol and isopropanol.

Examples

Figure 5:
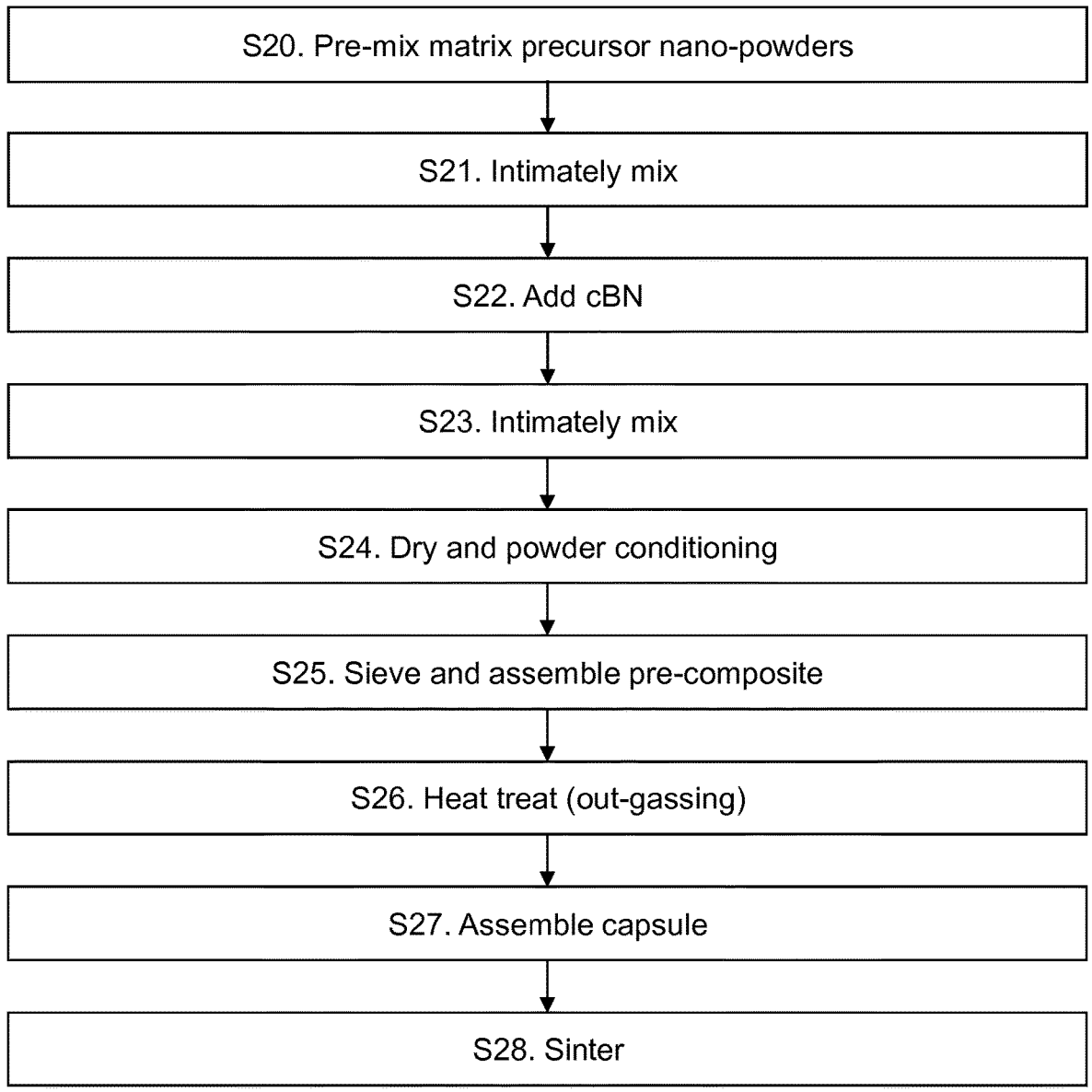
FIG. 5 is a flow diagram showing exemplary steps of a method of making a sintered PCBN material with no tungsten carbide.

A first set of example PCBN materials was made using matrix precursor powders comprising nano-powders, as described in FIG. 3. FIG. 5 shows the steps in more detail, with the following numbering corresponding to that of FIG. 5:

S20. Nano-matrix precursor powders were with an average particle size around 50 nm to 100 nm. Various matrix materials were prepared.

S21. The matrix precursor powders were intimately mixed using an ultrasonic mixer in various solvents. The ultrasonic mixer was a Branson 2000bdc, 20 kHz, 2.2 kW full wave 50 mm diameter horn at 40-60% amplitude.

S22. Cubic boron nitride (cBN) particles were added to the mixed matrix precursor powders.

S23. The mixed matrix precursor powders and cBN particles were ultrasonically mixed for 20 minutes.

S24. The resultant mixed powder was dried at low pressure (less than 500 mbar) and at above 60° C. to remove the solvent. The powders were conditions by slowly introducing oxygen to provide passivation of any aluminium surfaces.

S25. The dried powder was sieved and a pre-composite assembly was prepared.

S26. The pre-composite assembly was heat treated at greater than 1025° C. for two hours to remove any adsorbed water or gases. The heat treatment may be carried out at a low pressure.

S27. The outgassed pre-composite assembly was assembled into a capsule suitable for sintering.

S28. The capsule was sintered in an HPHT press at 1250° C. and 5.5 GPa to form a sintered PCBN material.

Figure 1:
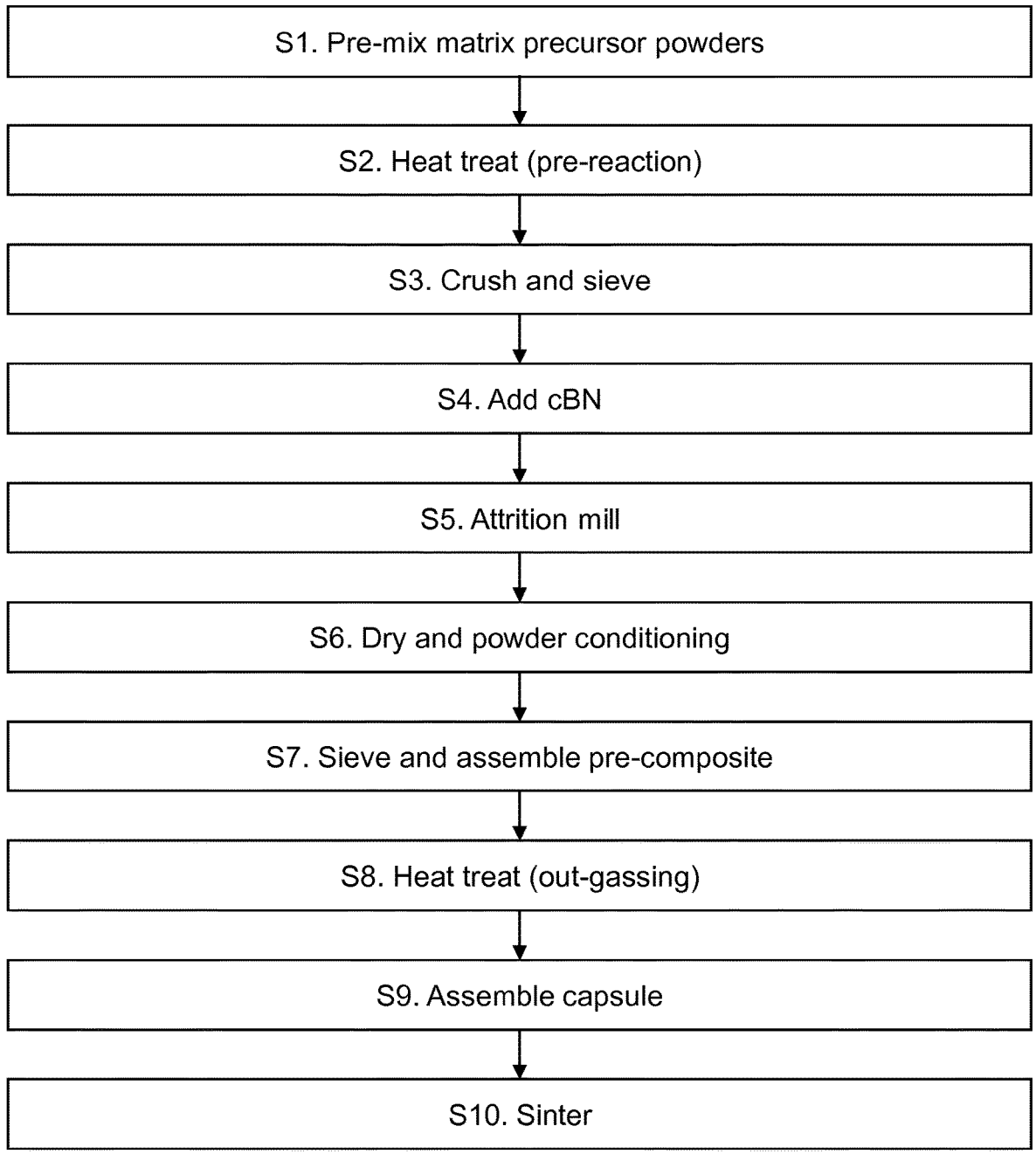
FIG. 1 is a flow diagram showing a known exemplary method of making a sintered PCBN material.

A reference PCBN material was also prepared using the technique shown in FIG. 1, to illustrate the difference between a material that has undergone attrition milling and picked up milling media, and PCBN materials that have not had the opportunity to pick up any milling media.

Table 1 shows the compositions and some manufacturing parameters of the examples.

TABLE 1

| Example | cBN vol % | Matrix composition wt % | Solvent |
|---|---|---|---|
| 1 | 40 | 45TiC/45TiN/10Al | Hexane |
| 2 | 40 | 45TiC/45TiN/10Al | Hexane |
| 3 | 40 | 45TiC/45TiN/10Al | Hexane |
| 4 | 40 | 45TiC/45TiN/10Al | Hexane |
| 5 | 55 | 45TiC/45TiN/10Al | Ethanol |
| 6 | 45 | 45TiC/45TiN/10Al | Isopropanol |
| 7 | 45 | 45TiC/45TiN/10Al | Hexane |
| 8 | 45 | 45TiC/45TiN/10Al | Isopropanol |
| 9 | 55 | 45TiC/45TiN/10Al | Isopropanol |
| 10 | 55 | 90TiCN/10Al | Isopropanol |
| 11 | 65 | 90TiCN/10Al | Isopropanol |
| 12 | 40 | 90TiCN/10Al | Isopropanol |
| 13 | 55 | 90TiN/10Al | Isopropanol |
| 14 | 55 | 45TiC/45TiN/10Al | Isopropanol |
| 15 | 65 | 76TiN/24Al | Isopropanol |
| 16 | 65 | 45TiC/45TiN/10Al | Isopropanol |
| 17 | 40 | 45TiC/45TiN/10Al | Isopropanol |
| Ref | 55 | 90TiCN/10Al (attrition milled) | Hexane |

Figure 6:
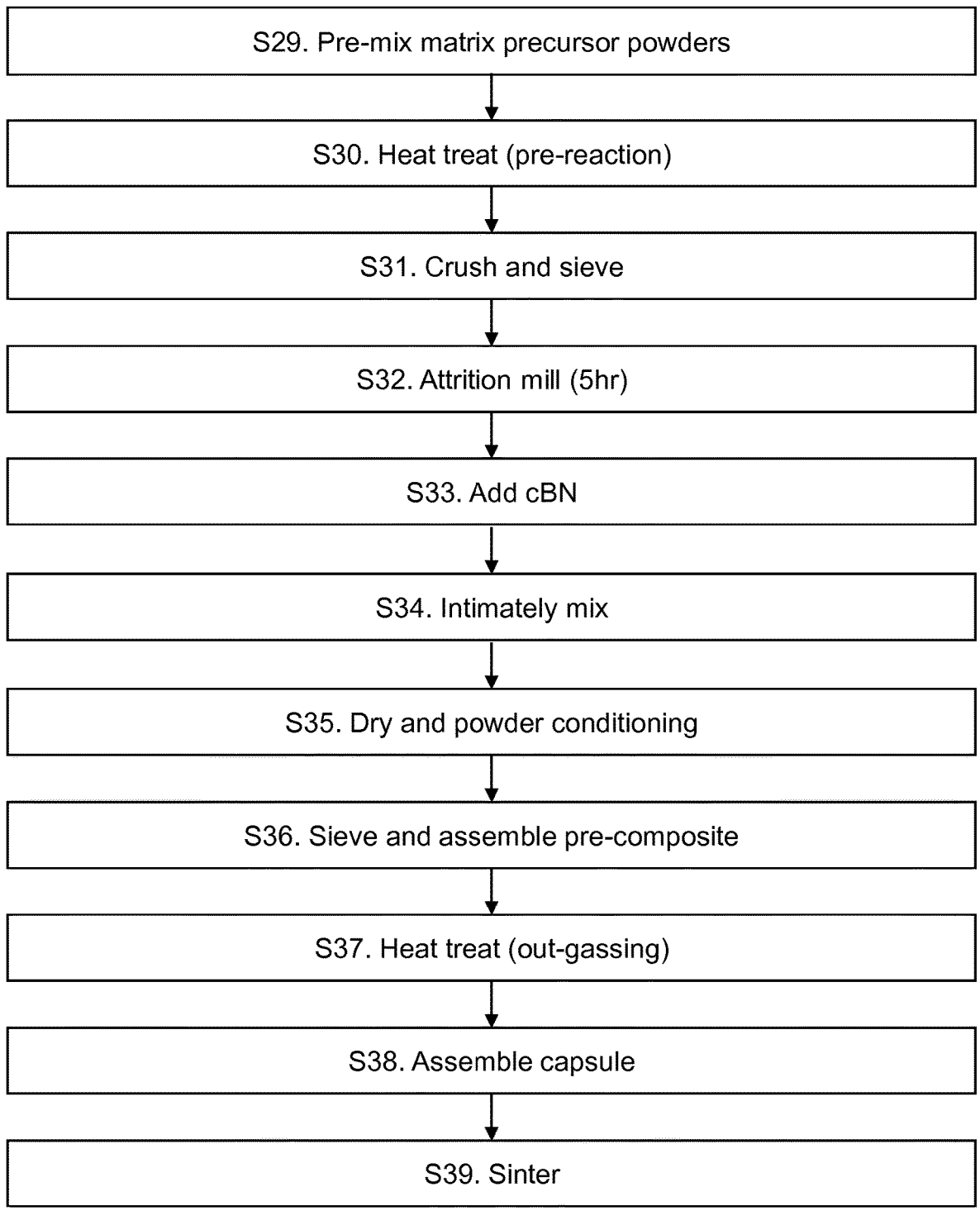
FIG. 6 is a flow diagram showing exemplary steps of a method of making a sintered PCBN material with a greatly reduced tungsten carbide content.

A second PCBN material was made by attrition milling matrix precursor powders before adding cBN, as shown in FIG. 4. FIG. 6 shows the steps in more detail, with the following numbering corresponding to that of FIG. 6:

S29. The matrix precursor powders having an average particle size of 1 to 10 μm were pre-mixed.

S30. The matrix precursor powders were heat treated at around 1025° C. for at least an hour to initiate a pre-reaction between the matrix precursor particles and to form a "cake".

S31. The cake was crushed and sieved to obtain the desired size fraction of particles.

S32. The resultant powders were attrition milled to break down the matrix precursor powders to a desired size (typically 50 to 700 nm) and to intimately mix the matrix precursor powders. Attrition milling was performed using tungsten carbide milling media.

S33. Cubic boron nitride (cBN) particles were added to the mixed matrix precursor powders.

S34. The mixed matrix powders and cBN particles were ultrasonically mixed for 20 minutes.

S35. The resultant mixed powder was dried at low pressure (less than 500 mbar) and at above 60° C. to remove the solvent. The powders were conditions by slowly introducing oxygen to provide passivation of any aluminium surfaces.

S36. The dried powder was sieved and a pre-composite assembly is prepared.

S37. The pre-composite assembly was heat treated at greater than 1025° C. for two hours to remove any adsorbed water or gases. The heat treatment may be carried out at a low pressure.

S38. The outgassed pre-composite assembly was assembled into a capsule suitable for sintering.

S39. The capsule was sintered in an HPHT press at 1250° C. and 5.5 GPa to form a sintered PCBN material.

Table 2 shows the compositions and some manufacturing parameters of an example made according to FIG. 6.

TABLE 2

| Example | cBN vol % | Matrix composition wt % | Solvent |
|---|---|---|---|
| 18 | 60 | 45TiC/45TiN/10Al | Hexane |

Figure 2:
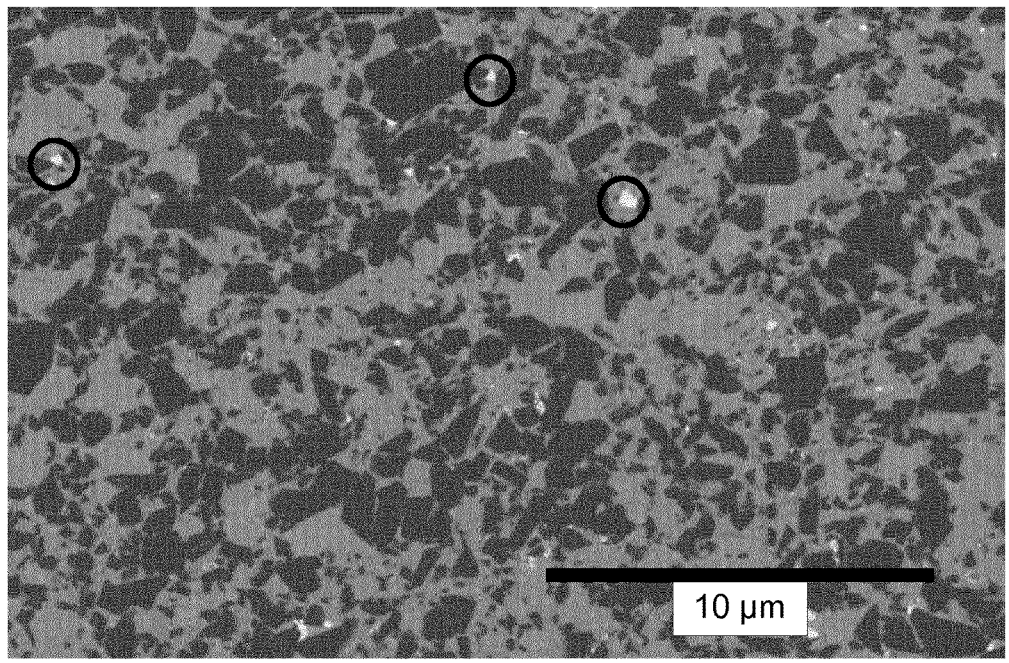
FIG. 2 is a micrograph showing an exemplary sintered PCBN material made according to the steps shown in FIG. 1.
Figure 7:
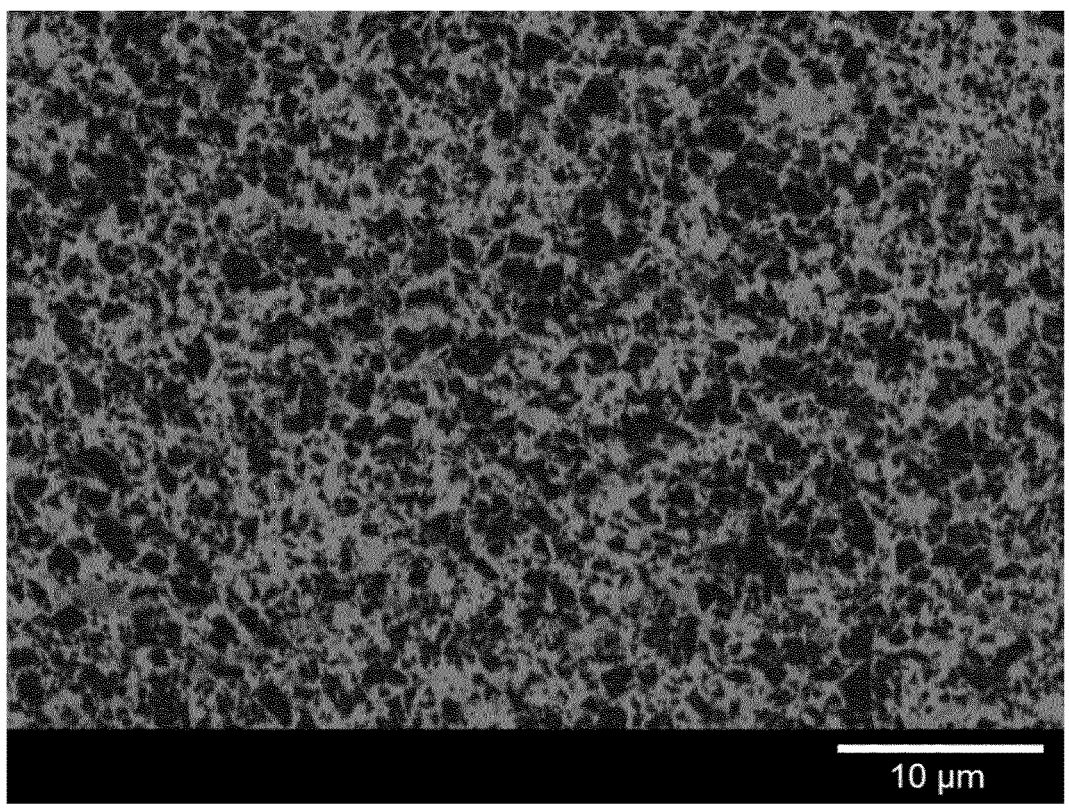
FIG. 7 is a scanning electron micrograph of a sample made with no tungsten carbide.
Figure 8:
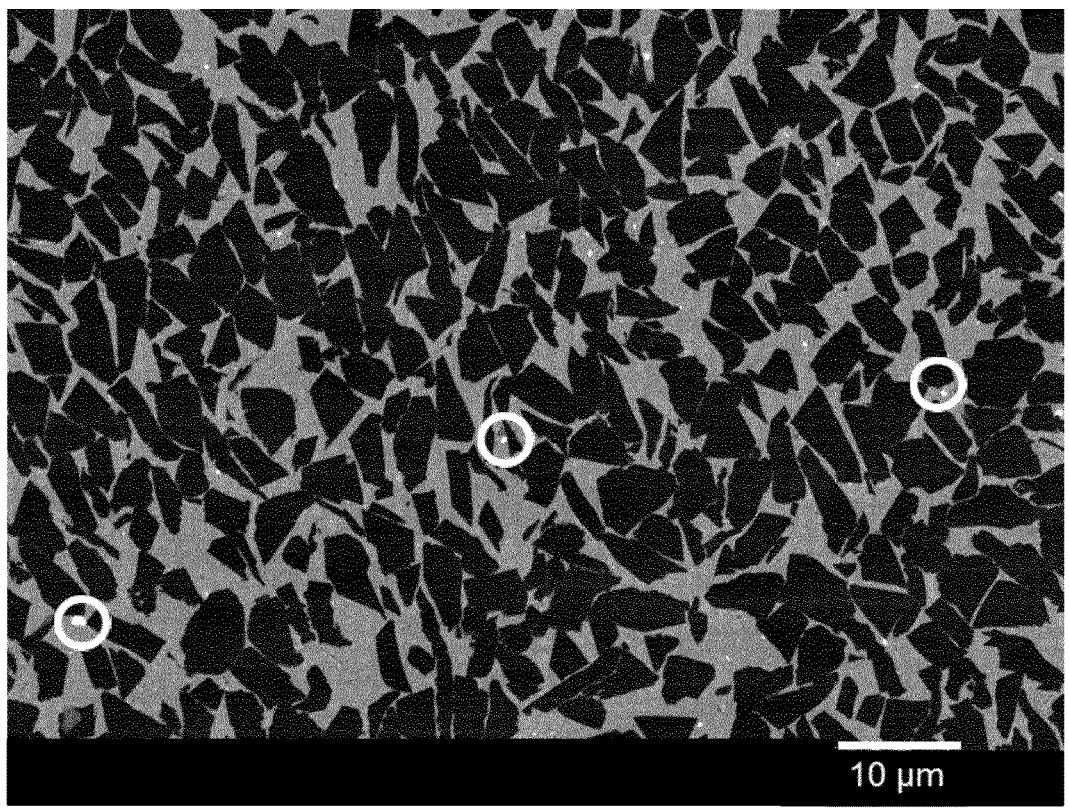
FIG. 8 is a scanning electron micrograph of a sample made with very low tungsten carbide.

FIG. 7 is a scanning electron micrograph of Example 9. In contrast to FIG. 2, there is no tungsten carbide present at all because no attrition milling step was performed. FIG. 8 is a scanning electron micrograph of Example 18. In this case, there is a very small amount of tungsten carbide present. Examples of tungsten carbide particles are highlighted in white circles. The amount of tungsten carbide was estimated to be around 0.2 weight percent.

Figure 9:
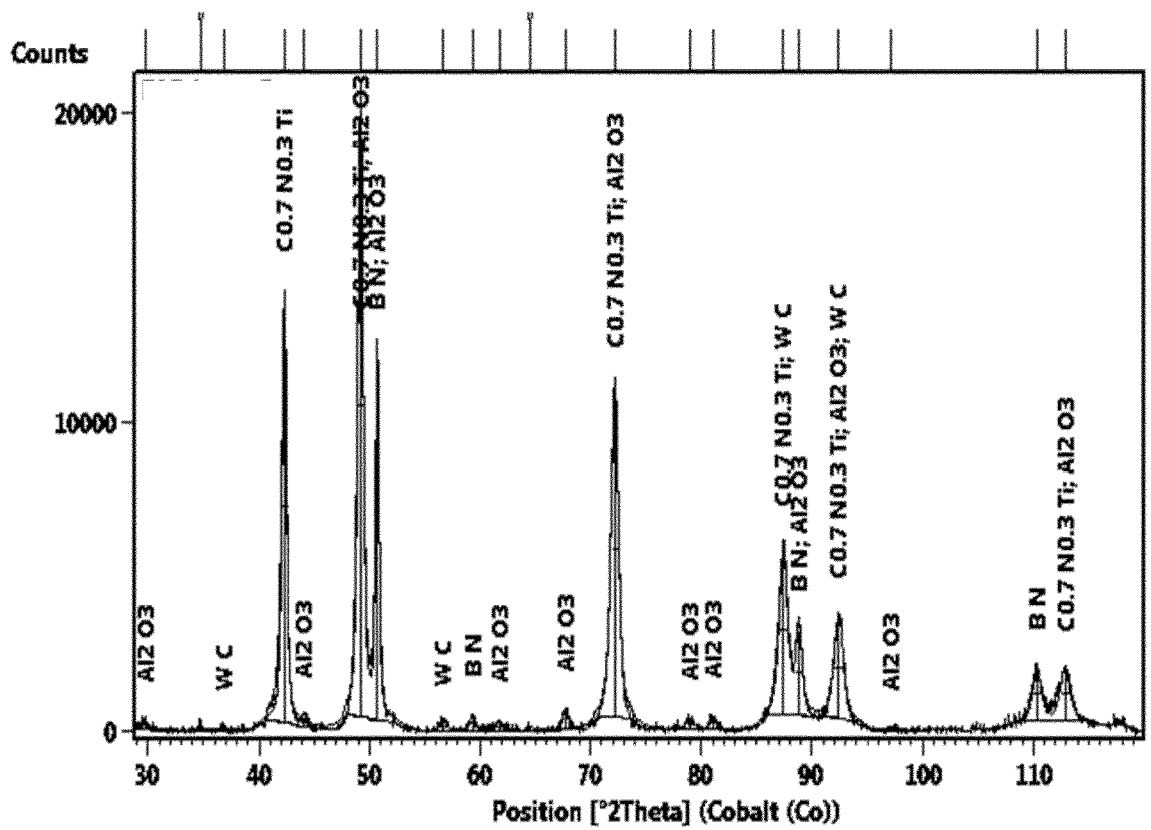
FIG. 9 is an X-ray diffraction trace showing the presence of tungsten carbide for a prior art PCBN material made using attrition milling.
Figure 10:
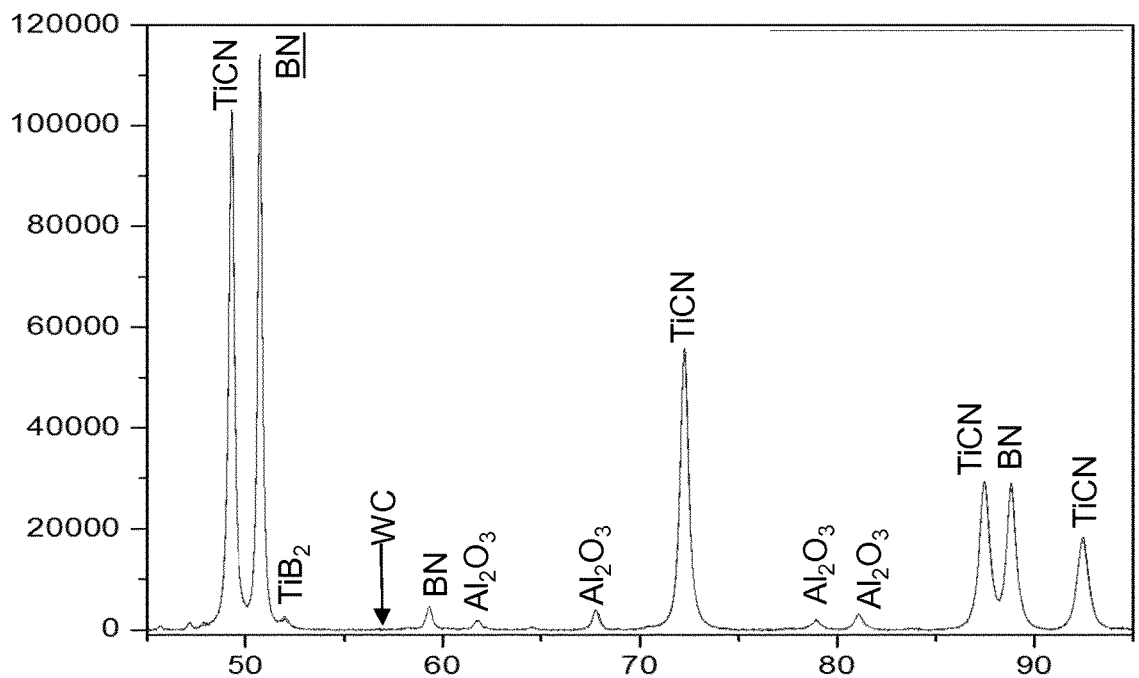
FIG. 10 is an X-ray diffraction trace showing the presence of tungsten carbide for an exemplary PCBN material made using attrition milling only on the binder precursor powders.

X-ray diffraction (XRD) of Examples 1 to 17 showed no trace of tungsten carbide. In contrast, XRD of the reference sample clearly showed peaks ascribed to tungsten carbide, as shown in FIG. 9. In contrast, an XRD trace obtained from Example 18 showed very small traces of tungsten carbide, as expected.

Some of the samples were analysed to measure their density, speed of sound (SOS), specific surface area (SSA) and hardness. The resultant data are shown in Table 3.

TABLE 3

| Example | Density g/cm$^3$ | SOS km/s | SSA g/m$^2$ | Vickers Hardness GPa |
|---|---|---|---|---|
| 1 | 4.21 | 11.51 | 22.33 | 23.79 |
| 2 | 4.22 | 11.66 | 22.33 | 25.33 |
| 3 | 4.11 | 11.76 | 21.14 | 25.12 |
| 4 | 4.20 | 11.83 | 21.14 | 26.38 |
| 5 | 4.01 | 12.60 | 22.66 | 27.84 |
| 6 | 4.22 | 11.45 | 23.87 | 26.02 |
| 7 | 4.19 | 11.55 | 23.15 | 25.56 |
| 8 | 4.20 | 11.45 | 25.66 | 25.38 |
| 9 | 4.05 | 12.35 | 24.44 | 28.35 |
| Ref | — | 12.39 | 17.11 | 29-30 |

Figure 11:
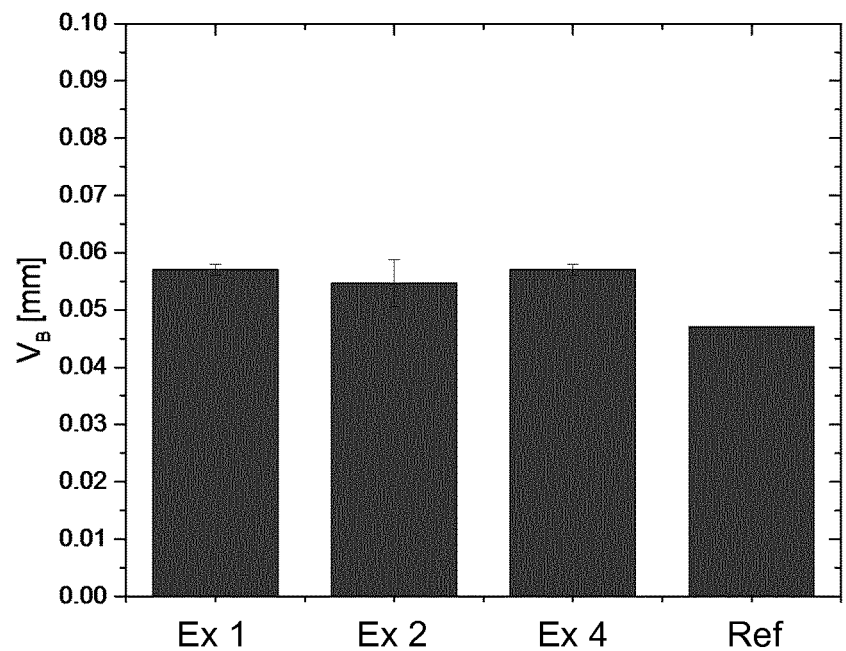
FIG. 11 shows measured flank wear resistance for tools made using PCBN materials in an H05 machining test.

Some of the example PCBN materials were formed into machining tools and tested in an H05 machining test ($V_c$=200 m/min, feed speed 0.1 mm/rev, depth of cut 0.15 mm, workpiece SAE8620 with a hardness of 60-62 HRC, performed on a: Glidemeister CTX500 lathe). Flank wear resistance is measured using $V_B$. The flank wear resistance of Examples 1, 2, and 4, and the reference sample, is shown in FIG. 11. Samples 1, 2 and 4 had a slightly improved flank wear resistance.

Figure 12:
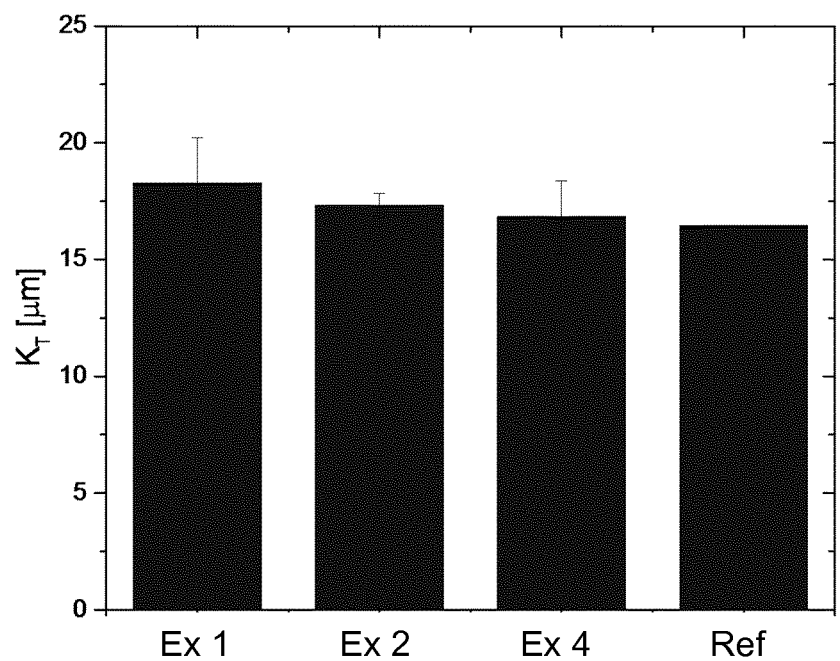
FIG. 12 shows measured crater wear resistance for tools made using PCBN materials in an H05 machining test.

Crater wear resistance (also known as chemical wear resistance) is measured by $K_T$. Examples 1, 2 and 4 all had a slightly improved crater wear resistance compared to the reference sample, as shown in FIG. 12. The improvement is thought to be from a combination of a lower cBN content and a lower tungsten carbide content.

The two specific embodiments described above each provide a way of producing a PCBN material with no milling media pickup or substantially reduced milling media pickup (such that the milling media comprises less than 0.5 weight percent of the PCBN material). This allows PCBN material with much more controllable and predictable properties to be prepared. Furthermore, the techniques also reduce the time to prepare PCBN materials.

A further set of exemplary powders was prepared using a dry acoustic mixing technique. Titanium carbonitride ($TiC_{0.5}N_{0.5}$) powder (1.3 µm average particle size) was pre-mixed with aluminium (6 µm average particle size) in a ratio of 90:10 by weight % in a 100 ml polyamide pot. 36 g of $TiC_{0.5}N_{0.5}$ and 4 g of the Al was weighed into the pot, which was sealed and placed in a LABRAM I dry acoustic mixer and run for 2 minutes at 40 G and in different experiments run for 2 minutes at 60 G.

The pre-mixed powder was then combined with cubic boron nitride powders with particle size of 4-5 µm and 6-7 µm to make 60 vol % and 70 vol % composites. This second step combination was carried out also under different conditions 40 G and 60 G.

The conditions are shown in Table 4 below/

TABLE 4

| Pre-mix | Post-mix | cBN particle size (µm) |
| --- | --- | --- |
| 40 G, 2 min | 40 G, 5 min | 4-5 |
| 40 G, 2 min | 40 G, 5 min | 6-7 |
| 60 G, 2 min | 60 G, 5 min | 4-5 |
| 60 G, 2 min | 60 G, 5 min | 6-7 |

Final powders were sintered in a belt-type high pressure high temperature apparatus under approximately 5.5 GPa and 1400° C. Sintered materials were cut and polished and the microstructural analysis in the SEM showed that the microstructure of the resultant materials were homogeneous.

In another set of experiments, separate TiC and TiN powders (average particle size 1-2 microns) were pre-mixed together at 80 G for 2 minutes. 4-5 µm cBN particles were then mixed with the TiC/TiN powder at 80 G for 30 seconds and 100 G for 2 minutes. In another step, 6 µm aluminium was added to the system and mixed at 80 G for 30 seconds and 100 G for 2 minutes. The powders were mixed in sufficient quantities to make a composition of 60 vol % cBN and the remaining TiC/TiN:Al ratio was 90:10 by weight. Analysis of the resultant powders and sintered materials showed a homogeneous structure.

Finally, 90 g of 1.3 µm cBN was mixed with 10 g of 6 µm aluminium at 80 G for 5 minutes. The resultant microstructure showed large agglomerates. In another experiment these powders were mixed in 20 g quantities in a 100 ml polyamide pot in the LABRAM I mixer, with 200 wt % 0.7 mm WC balls in the pot. The mixture was run at 80 G for 30 seconds and 100 G for 2 minutes. The microstructure of the final sintered material, showed a homogeneous structure.

Definitions

As used herein, PCBN material refers to a type of super hard material comprising grains of cBN dispersed within a matrix comprising metal or ceramic. PCBN is an example of a super hard material.

As used herein, a "PCBN structure" comprises a body of PCBN material.

A "matrix material" is understood to mean a matrix material that wholly or partially fills pores, interstices or interstitial regions within a polycrystalline structure. The term "matrix precursor powders" is used to refer to the powders that, when subjected to a high pressure high temperature sintering process, become the matrix material.

A multi-modal size distribution of a mass of grains is understood to mean that the grains have a size distribution with more than one peak, each peak corresponding to a respective "mode". Multimodal polycrystalline bodies may be made by providing more than one source of a plurality of grains, each source comprising grains having a substantially different average size, and blending together the grains or particles from the sources. In one embodiment, a PCBN material may comprise cBN grains having a multimodal distribution.

The above description refers to average particle size. This is measured using an equivalent circle diameter (ECD) technique. The ECD distribution of a plurality of loose, unbounded and non-agglomerated grains can be measured by means of laser diffraction, in which the grains are disposed randomly in the path of incident light and the diffraction pattern arising from the diffraction of the light by the grains is measured. The diffraction pattern may be interpreted mathematically as if it had been generated by a plurality of spherical grains, the diameter distribution of which being calculated and reported in terms of ECD. Aspects of a grain size distribution may be expressed in terms of various statistical properties using various terms and symbols. Particular examples of such terms include mean, median and mode. The size distribution can be thought of as a set of values Di corresponding to a series of respective size channels, in which each Di is the geometric mean ECD value corresponding to respective channel i, being an integer in the range from 1 to the number n of channels used.

Mean values obtained by means of laser diffraction methods may be most readily expressed on the basis of a distribution of grain volumes, the volume mean can be represented as D[4,3] according to a well-known mathematical formula. The result can be converted to surface area distribution, the mean of which being D[3,2] according to a well-known mathematical formula. Unless otherwise stated, mean values of size distributions as used in the present disclosure refer to the volume-based mean D[4,3]. The median value D50 of a size distribution is the value dividing the plurality of grains into two equal populations, one consisting of grains having ECD size above the value and the other half having ECD size at most the value. The mode of a size distribution is the value corresponding to the highest frequency of grains, which can be visualised as the peak of the distribution (distributions can include more than one local maximum frequency and be said to be multimodal). Various other values d(y) can be provided, expressing the size below which a fraction y of the plurality of grains reside in the distribution. For example, d(0.9) refers to the ECD size below which 90 percent of the grains reside, d(0.5) refers to the ECD size below which 50 percent of the grains reside and d(0.1) refers to the ECD size below which 10 percent of the grains reside.

While this invention has been particularly shown and described with reference to embodiments, it will be understood by those skilled in the art that various changes in form and detail may be made without departing from the scope of the invention as defined by the appended claims. For example, although all of the examples use cBN as the superhard phase, it will be appreciated that the same techniques may be used for other types of superhard materials dispersed in a matrix material.

The invention claimed is:

1. A method of making a polycrystalline cubic boron nitride, PCBN, material, the method comprising:
   providing a matrix precursor powder comprising particles having an average particle size no greater than 250 nm;
   providing a cubic boron nitride, cBN, powder comprising particles of cBN having an average particle size of at least 0.2 μm;
   intimately mixing the matrix precursor powder and the cBN powder; and
   sintering the intimately mixed powders at a temperature of at least 1100° C. and a pressure of at least 3.5 GPa to form the PCBN material comprising particles of cubic boron nitride, cBN dispersed in a matrix material;
   wherein the PCBN material does not include any of the following milling media materials: tungsten carbide, silicon carbide, zirconium oxide, and boron carbide; and
   wherein the method does not involve any milling process comprising said milling media materials.

2. The method of making a polycrystalline cubic boron nitride, PCBN, material according to claim 1, further comprising providing a matrix precursor powder comprising particles having an average particle size no greater than 100 nm.

3. The method of making a PCBN material according to claim 1, wherein the step of intimately mixing the matrix powder and the cBN powder comprises:
   dispersing the matrix precursor powder and the cBN powder in a solvent;
   mixing the solvent, matrix precursor powder and cBN powder using an ultrasonic mixer; and
   removing the solvent to leave an intimately mixed powder of matrix precursor particles and cBN particles.

4. The method of making a PCBN material according to claim 1, wherein the step of intimately mixing the matrix precursor powder and the cBN powder comprises dry acoustic mixing.

5. The method of making a PCBN material according to claim 1, comprising providing cBN particles with an average size between 0.2 and 15 μm.

6. The method of making a PCBN material according to claim 1, comprising providing cBN particles with an average size greater than 1 μm.

7. The method of making a PCBN material according to claim 1, comprising providing cBN particles with an average size in a range of 5 μm to 10 μm.

8. The method of making a PCBN material according to claim 1, wherein the matrix material comprises materials selected from compounds of any of titanium and aluminium.

9. The method of making a PCBN material according to claim 8, wherein the matrix material comprises any of titanium carbonitride, titanium carbide, titanium nitride, titanium diboride, aluminium nitride and aluminium oxide.

* * * * *